United States Patent
Wen et al.

(10) Patent No.: US 11,392,510 B2
(45) Date of Patent: Jul. 19, 2022

(54) MANAGEMENT METHOD OF CACHE FILES IN STORAGE SPACE AND RECORDING DEVICE FOR STORING CACHE FILES

(71) Applicant: INDUSTRIAL TECHNOLOGY RESEARCH INSTITUTE, Hsinchu (TW)

(72) Inventors: Ching-Hsiang Wen, Zhubei (TW); Sheng-An Chang, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 38 days.

(21) Appl. No.: 16/997,856

(22) Filed: Aug. 19, 2020

(65) Prior Publication Data

US 2021/0390062 A1    Dec. 16, 2021

(30) Foreign Application Priority Data

Jun. 10, 2020   (TW) ................................. 109119558

(51) Int. Cl.
*G06F 12/121*   (2016.01)

(52) U.S. Cl.
CPC .... *G06F 12/121* (2013.01); *G06F 2212/1044* (2013.01)

(58) Field of Classification Search
None
See application file for complete search history.

(56) References Cited

U.S. PATENT DOCUMENTS

| 8,880,838 B2 | 11/2014 | Kaiser et al. |
| 9,430,376 B2 | 8/2016 | Horn |
| 10,437,470 B1* | 10/2019 | Zhi ......................... G06F 3/064 |
| 2002/0004917 A1* | 1/2002 | Malcolm ............. G06F 16/9574 |
|  |  | 714/4.1 |
| 2002/0112116 A1* | 8/2002 | Nelson .................. G06F 16/284 |
|  |  | 711/103 |
| 2003/0110190 A1* | 6/2003 | Achiwa ................. G06F 16/185 |

(Continued)

FOREIGN PATENT DOCUMENTS

| CN | 105074673 B | 11/2018 |
| TW | I514161 B | 12/2015 |

OTHER PUBLICATIONS

TW Office Action in Application No. 109119558 dated Aug. 12, 2021.

*Primary Examiner* — William E. Baughman
(74) *Attorney, Agent, or Firm* — Maschoff Brennan

(57) ABSTRACT

A management method of cache files in storage space, adapted to a storage space storing a plurality of cache files, the management method comprises: forming a cache file status list which records a plurality of file names and a plurality of file status; determining whether a storage condition of the storage space is in a healthy condition; assigning a plurality of corresponding tags to the plurality of file status when the storage condition is not in the healthy condition, and forming a sorted cache file list; and deleting the last file name from the sorted cache file list and the cache file from the storage space corresponding to the file name, wherein the sorted cache file list records the file names which are sorted from a file name of a cache file that should be kept most to another file name of another cache file that should be deleted most.

18 Claims, 2 Drawing Sheets

(56) References Cited

U.S. PATENT DOCUMENTS

| | | | |
|---|---|---|---|
| 2005/0172080 A1* | 8/2005 | Miyauchi | G06F 12/121 |
| | | | 711/136 |
| 2011/0178997 A1 | 7/2011 | Johnson et al. | |
| 2014/0122774 A1 | 5/2014 | Xian et al. | |
| 2017/0357453 A1* | 12/2017 | Ko | G06F 3/0608 |
| 2018/0018158 A1 | 1/2018 | Kalke et al. | |

* cited by examiner

MANAGEMENT METHOD OF CACHE FILES IN STORAGE SPACE AND RECORDING DEVICE FOR STORING CACHE FILES

CROSS-REFERENCE TO RELATED APPLICATIONS

This non-provisional application claims priority under 35 U.S.C. § 119(a) on Patent Application No(s). 109119558 filed in ROC on Jun. 10, 2020, the entire contents of which are hereby incorporated by reference.

TECHNICAL FIELD

This disclosure relates to a management method of cache files in storage space and a recording device for storing cache files.

BACKGROUND

Under the background that project analysis and prediction through big data are very popular, during the process of analysis and prediction, various parameters and processing/analysis methods are often adjusted to carry out research, even the same data group may derive various intermediate data due to different research purposes. The intermediate data can be viewed as cache files of the project. The cache files help avoid the extra time and computing resources caused by executing the same project to regenerate the intermediate data for different analysis and application purposes.

In order to maintain a storage condition of the storage space in a good condition, a common method of maintaining the storage space is to delete the cache files from the storage space in a timely manner. For example, some common methods of clearing the storage space are to delete the cache files that are seldom read, and to delete the cache files with larger file capacities, or, to delete a part of or all the cache files periodically to maintain the storage space. Since many management methods for cache files generally focus on the files with smaller capacities, there is no need to take the generation time of the cache file into consideration. Therefore, in the case where the generation time is longer when the capacity of the cache file is larger, the conventional management method for cache files is not suitable for the management of the aforementioned intermediate data.

Under the condition that cache files will definitely occupy storage resources, how to properly arrange the storage resources and the time cost on generating the cache files is an important issue.

SUMMARY

Accordingly, this disclosure provides a management method of cache files in storage space and recording device for storing cache files. The present disclosure helps manage the cache files stored in the storage space and maintain the storage condition of the storage space in a healthy condition.

According to one or more embodiment of this disclosure, a management method of cache files in storage space, adapted to a storage space storing a plurality of cache files, the management method comprising: forming a cache file status list, wherein the cache file status list records a plurality of file names of the cache files and a plurality of file status corresponding to a plurality of features of each cache file; determining whether a storage condition of the storage space is in a healthy condition; when the storage condition is not in the healthy condition, for the features of each cache file assigning a plurality of corresponding tags to the plurality of file status and forming a sorted cache file list, wherein the tags are configured to indicate an erasable level of the file status of a corresponding cache file of the cache files, the sorted cache file list records the file names of the cache files, and the file names in the sorted cache file list are sorted from a file name of a cache file that should be kept most to another file name of another cache file that should be deleted most according to the erasable level marked by the tags of the cache files; and deleting the last file name from the sorted cache file list to update the sorted cache file list, and deleting the cache file from the storage space corresponding to the last file name.

According to one or more embodiment of this disclosure, a recording device for storing cache files, comprising: a storage space, storing a cache file status list and a sorted cache file list, wherein the cache file status list records a plurality of file names and a plurality of file status corresponding to a plurality of features of each cache file, and the sorted cache file list records the file names of the cache files, and the file names in the sorted cache file list are sorted from a file name of a cache file that should be kept most to another file name of another cache file that should be deleted most according to an erasable level marked by a plurality of tags of the cache files, wherein the tags are configured to mark the erasable level of the file status of a corresponding cache file of the cache files; and a processor, electrically connected to the storage space, configured to adjust the sorted cache file list according to the erasable level of the tags of the cache files, so as to sort the file name of the cache file that should be kept most to the another file name of the another cache file that should be deleted most in the sorted cache file list, and determine whether a storage condition of the storage space is in a healthy condition, assign the corresponding tags to the plurality of file status when the storage condition is not in the healthy condition, and form the sorted cache file list, the processor further configured to delete the last file name from the sorted cache file list to update the sorted cache file list, and delete the cache file from the storage space corresponding to the last file name.

In view of the above description, according to one or more embodiments of a management method of cache files in storage space and a recording device for storing cache files of the present disclosure, it is possible to manage cache files automatically and reduce the need to expand storage space. Also, it is possible to make sure the storage condition of the storage space is maintained in the healthy condition. In addition, according to one or more embodiments of a management method of cache files in storage space and a recording device for storing cache files of the present disclosure, cache files which are larger in capacity or with higher cost when being regenerated are not easily deleted. Therefore, cache files with higher priority or with higher cost when being regenerated are properly kept, and the deleted cache files are made sure to be of low priority or with lower cost when being regenerated.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
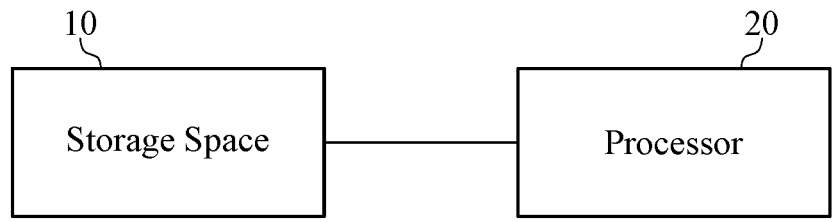
FIG. 1 illustrates a block diagram of a recording device for storing a plurality of cache files according to an embodiment of the present disclosure.

Please refer to FIG. 1, FIG. 1 illustrates a block diagram of a recording device for storing a plurality of cache files according to an embodiment of the present disclosure. The recording device for storing a plurality of cache files illustrated in the embodiment comprises a storage space 10 and a processor 20. The processor 20 is electrically connected to the storage space 10, wherein the storage space 10 is, for example, a storage space of a hard disk or other hardware devices with storage function. The cache files are, for example, obtained by the processor 20 executing a project. That is, the cache files are, for example, obtained during the process of the processor 20 executing the project, however the present disclosure does not limit the methods of obtaining the cache files. A size of the cache file may differ according to the different executed original data (the project) and different ways of processing. However, when the original data is big data, the size of the cache file may be up to a size range of dozens GB or even hundreds GB. Also, the time required to execute the project to generate the cache files in the context of analysis or processing of big data, as the data becomes larger and the complexity of the processing procedure increases, the time required to generate the cache files may even reach to days.

Since the conventional management method does not take the time required to generate the cache files into consideration, and it's only suitable for cache files that are around "GB" in size. The present disclosure takes the time required to generate the cache files into consideration during the management of the cache files. Therefore, the present disclosure is more suitable for the analysis and prediction of the project using big data.

The storage space 10 can be the storage space of an advanced technology attachment (ATA) hard disk, a serial advanced technology attachment (SATA) hard disk, a serial advanced small computer system interface (SAS) hard disk and a solid-state drive (SSD) etc. The processor 20 can be a central processing unit (CPU) and a digital signal processor (DSP). The storage space 10 and the processor 20 of the present disclosure are not limited to the aforementioned types.

Figure 2:
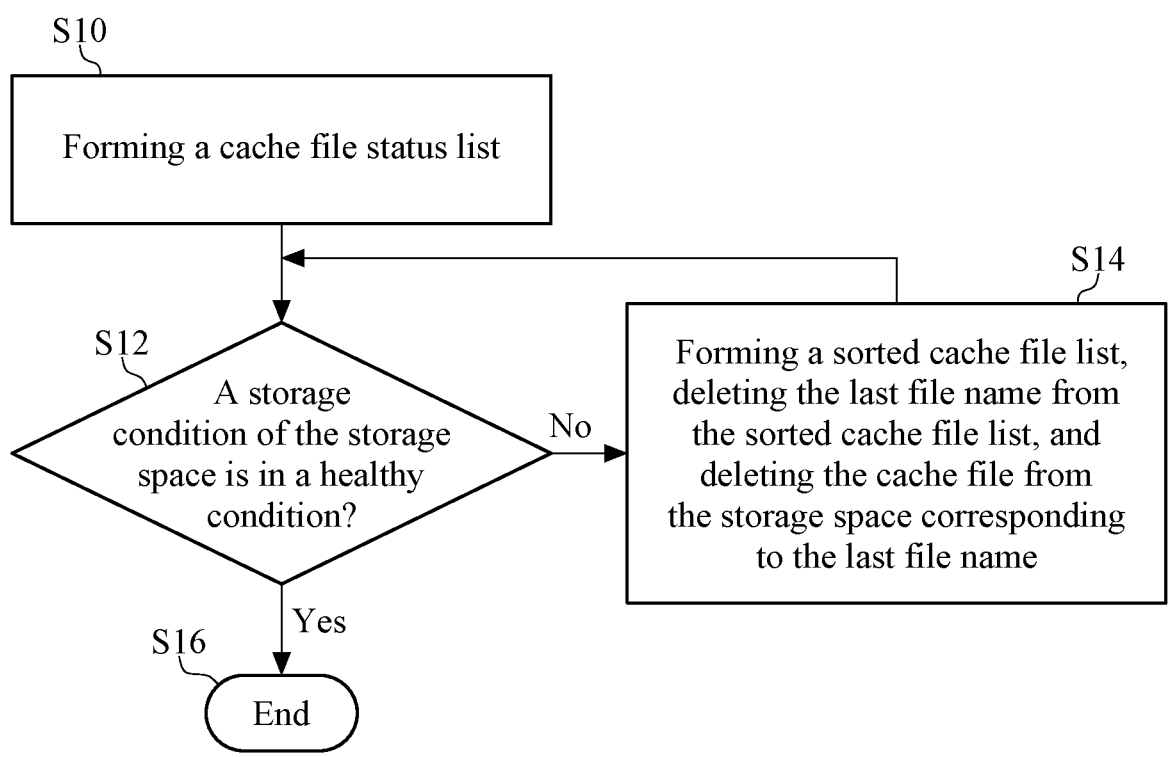
FIG. 2 illustrates a flow chart of a management method of cache files in a storage space according to an embodiment of the present disclosure.

In order to better explain the embodiments of the present disclosure, please refer to both FIG. 1 and FIG. 2, wherein FIG. 2 is a flow chart of a management method of cache files in a storage space according to an embodiment of the present disclosure. The management method of cache files in a storage space of the present disclosure is adapted to the storage space 10 storing a plurality of cache files.

Please refer to FIG. 2, step S10: forming a cache file status list.

The processor 20 forms the cache file status list, and the cache file status list is stored in the storage space 10. The cache file status list records a plurality of file names of the cache files stored in the storage space 10, and a plurality of file status of each cache file corresponding to a plurality of features.

Step S12: determining whether a storage condition of the storage space is in a healthy condition.

In this step, the processor 20 determines whether an occupancy ratio of the storage space 10 falls within an expected occupancy ratio, wherein the occupancy ratio is preferably the ratio of the storage space 10 being occupied; the expected occupancy ratio is preferably the upper limit of the storage space 10 can be occupied. When the occupancy ratio of the storage space 10 falls within the expected occupancy ratio, the processor 20 determines the storage condition of the storage space 10 is in the healthy condition; when the occupancy ratio of the storage space 10 does not fall within the expected occupancy ratio, the processor 20 determines the storage condition of the storage space 10 is not in the healthy condition. In addition, the processor 20 can further determine whether the storage condition of the storage space is in the healthy condition at every predetermined interval, wherein the predetermined interval is, for example, 8 hours, 24 hours etc.

Take percentage as an example for the storage space 10. When the overall space of the storage space 10 is 100%, and the expected occupancy ratio is, for example, 80%, then it means the percentage of the storage space 10 being occupied preferably does not exceed 80% of the overall space of the storage space 10. That is, assuming the overall space of the storage space 10 is 100 TB, when the space of the storage space 10 being occupied by the cache files is 90 TB, then the occupancy ratio of the storage space 10 is 90%, which exceeds the expected occupancy ratio (80%). Therefore, the processor 20 determines the storage condition of the storage space 10 is not in the healthy condition. On the contrary, when the space of the storage space 10 being occupied by the cache files is 60 TB, then the occupancy ratio of the storage space 10 is 60%. Therefore, the processor 20 determines the storage condition of the storage space 10 is in the healthy condition.

Accordingly, when the storage condition of the storage space 10 is not in the healthy condition, then the method continues to step S14 to form a sorted cache file list. Contrarily, when the storage condition of the storage space 10 is in the healthy condition, then continues to step S16 to end the method.

Step S14: forming a sorted cache file list, deleting the last file name from the sorted cache file list, and deleting the cache file from the storage space corresponding to the last file name.

The processor 20 forms the sorted cache file list. The sorted cache file list records all the file names of the cache files stored in the storage space 10, and the file names of each cache file are arranged according to their erasable level. Thus, when there is a need to delete the cache file stored in the storage space 10, the processor 20 can delete the last file name from the sorted cache file list according to the order listed in the sorted cache file list, and delete the cache file corresponding to the last file name from the storage space 10. The details of forming the sorted cache file list will be illustrated below.

In addition, after performing step S14 to delete the cache file corresponding to the last file name, the management method of the present embodiment can continue performing step S12 to determine whether the storage condition of the storage space 10 is in the healthy condition. Then delete the last file name from the sorted cache file list and its corresponding cache file when the storage condition of the storage space 10 is still not in the healthy condition, so as to restore and maintain the storage condition of the storage space 10 in the healthy condition.

When the processor 20 determines the storage condition of the storage space 10 is in the healthy condition after deleting the cache file corresponding to the last file name from step S14, the processor 20 can delete the sorted file list stored in the storage space 10 to save the storage capacity of the storage space 10 and continue to step S16 to end the method.

Furthermore, the management method of the embodiment can be performed regularly, meaning updating the cache file status list regularly (S10), or checking the storage condition of the storage space 10 (S12) regularly after forming the cache file status list. Besides, the management method of the embodiment can further continue forming the sorted cache file list (S14) when the storage condition of the storage space 10 is not in the healthy condition, so as to maintain the storage condition of the storage space 10. After deleting the cache file corresponding to the last file name in step S14, the management method of the embodiment can then continue to step S16 to end the method, and determine whether to perform step S14 based on the next result of step S12 performed so as to keep as many cache files stored in the storage space 10 as possible.

The following is an example of the operation of the management method shown in FIG. 2. Please refer to both FIG. 2 and table 1 shown below, wherein table 1 is an example of the cache file status list.

TABLE 1

| File name | Number of cache files of the project | Execution count | File capacity | Reference execution count | Last execution time of the project |
|---|---|---|---|---|---|
| A | 5 | 4 | 10 G | 20 | 2019 Feb. 21 08:13:43 |
| B | 1 | 7 | 20 G | 22 | 2019 Feb. 19 13:05:33 |
| C | 2 | 6 | 8 G | 21 | 2019 Feb. 20 10:27:15 |

Take the cache file status list shown by table 1 for example. The file names of the cache files are A, B, and C, each file name represents one cache file, and each file name has a file status corresponding to each feature. For example, the file status of file name A corresponding to the "number of cache files of the project" feature is "5".

After obtaining the cache file status list, the processor 20 can assign a corresponding tag to each file status to form the sorted cache file list as shown in below table 2 when the storage condition of the storage space 10 is not in the healthy condition. The tags are preferably used to mark the erasable levels of the file status corresponding to each feature, wherein the erasable levels arranged from high to low are, for example, "must delete", "may delete", "may keep", and "must keep".

TABLE 2

| File name | Number of cache files of the project | Execution count | File capacity | Reference execution count | Last execution time of the project |
|---|---|---|---|---|---|
| A | may delete | may delete | may delete | may keep | may keep |
| C | must delete | may keep | may keep | may keep | may keep |
| B | must delete | may keep | must delete | may keep | may keep |

The order of file names A to C shown in table 2 is sorted according to the number of each tag, wherein the tags are preferably used to mark the erasable levels of the file status.

That is, in the cache file status list of table 1, each file status corresponds to one tag (for example, the file status corresponds to "file capacity" feature of file name A shown in table 1 is "10 G", therefore the "10 G" file status can correspond to the "may delete" tag shown in table 2). Please continue referring to table 2, file name B has two "must delete" tags; file name C has one "must delete" tag; file name A does not have "must delete" tag. The processor 20 can then determine the file name B ranks the highest in erasable level, and file name C has a higher erasable level than file name A. Therefore, file name B is sorted to the end of the sorted cache file list, and file name A is sorted to the top of the sorted cache file list.

Besides, in another example (not shown in table 2), when the file names A to C all have the same amount of "must delete" tags, the processor 20 can then sort the file names A to C according to the amount of "may delete" tags.

Further, when the numbers of tags of each erasable level of file names A to C are the same (not shown in table 2), the processor 20 can sort the file names A to C in the sorted cache file list according to the erasable levels of the tags that correspond to a feature with the highest priority. Accordingly, the file name with higher erasable level corresponding to the feature with the highest priority can be sorted to the end of the sorted cache file list. In other words, when file names A to C all have the same amount of tags of each erasable level, wherein for the most important feature "number of cache files of the project", file name C has the "must delete" tag that has a higher erasable level, and files name A and B both have the "may delete" tag that has a lower erasable level. Therefore, the processor 20 can then sort file name C after files name A and B accordingly.

The features of the cache files can comprise "generation time", "last execution time", "number of cache files of the project", "execution count", "file capacity", "reference execution count" and "last execution time of the project", etc. It should be noted that the described features are only examples. The number and types of the features of the present invention are not limited to the listed features, and the processor 20 can adjust the number and types of the features based on user's command.

To be more specific, the "generation time" feature is preferably the time needed to generate the cache file when executing the project. For example, when the time needed to generate the cache file is longer, then the erasable level of the cache file is lower. The "last execution time" feature is preferably a time interval between the cache file last being accessed to the current time. If the cache file is not accessed after being generated, the "last execution time" feature can also be a time interval between the cache file being generated to the current time. The "number of cache files of the project" feature is preferably a total amount of cache files, including the cache file, generated when executing the project. The "execution count" feature is preferably the number of times the cache file being accessed/read. The "file capacity" feature is preferably a capacity occupied by a respective one of the cache files in the storage space 10. The "reference execution count" feature is preferably a number of times that other cache files with the same generation process as the cache file are executed in a system having a plurality of storage spaces including the storage space 10. The erasable level is preferably lower when the reference execution count is higher so as to avoid deleting the cache file that might be accessed frequently in the future. The "last execution time of the project" feature is preferably a time of the project that generates the cache file last being executed. The "last execution time of the project" feature can also be a time the cache file is generated. The erasable level is preferably lower when the last execution time of the project is closer to the current time, so as to avoid deleting the cache file that might still be accessed in the near future.

Based on the above description of tables 1 and 2, the cache file status list is configured to present the file status of the cache file corresponding to each feature. The file names of the sorted cache file list are sorted according to the cumulative number of tags corresponding to the status of the cache files, so that the files name in the sorted cache file list are sorted from a file name of a cache file that should be kept most to another file name of another cache file that should be deleted most. Take table 2 as an example, the file name of the cache file that should be kept most is file A; the file name of the cache file that should be deleted most is file B. However, the files name in the sorted cache file list can also be sorted from a file name of a cache file that should be deleted most to another file name of another cache file that should be kept most. The present disclosure does not limit the way of sorting the files names.

After forming the cache file status list and determining the storage condition of the storage space 10 is not in the healthy condition in step S12, the management method continues to step S14 to form the sorted cache file list, delete the last file name from the sorted cache file list and delete the cache file from the storage space 10 corresponding to the last file name.

Please continue referring to step S14 of FIG. 2 (forming the sorted cache file list, deleting the last file name from the sorted cache file list and deleting the cache file from the storage space corresponding to the last file name) and table 2.

Take the sorted cache file list shown by table 2 for example, the processor 20 deletes file name B and deletes cache file B (referred to as "file B" hereinafter) corresponding to the file name B from the storage space 10, so as to update the sorted cache file list. Therefore, the sorted cache file list shown by table 2 will then only include file names A and C, and the storage space 10 only stores the corresponding cache file A (referred to as "file A" hereinafter) and cache file C (referred to as "file C" hereinafter).

Please continue referring to step S14 of FIG. 2 and take table 2 for example, after deleting file name B and file B from the storage space 10, the management method further continues to delete file name C from the updated sorted cache file list and delete file C from the storage space 10 when the storage condition of the storage space 10 is still determined to not be in the healthy condition in step S12. Therefore, it is possible to avoid the storage space 10 from being occupied by cache files of lower priority, to avoid accidentally deleting important cache files when adjusting the storage space 10, and to maintain the storage condition of the storage space 10 in the healthy condition.

Figure 3:
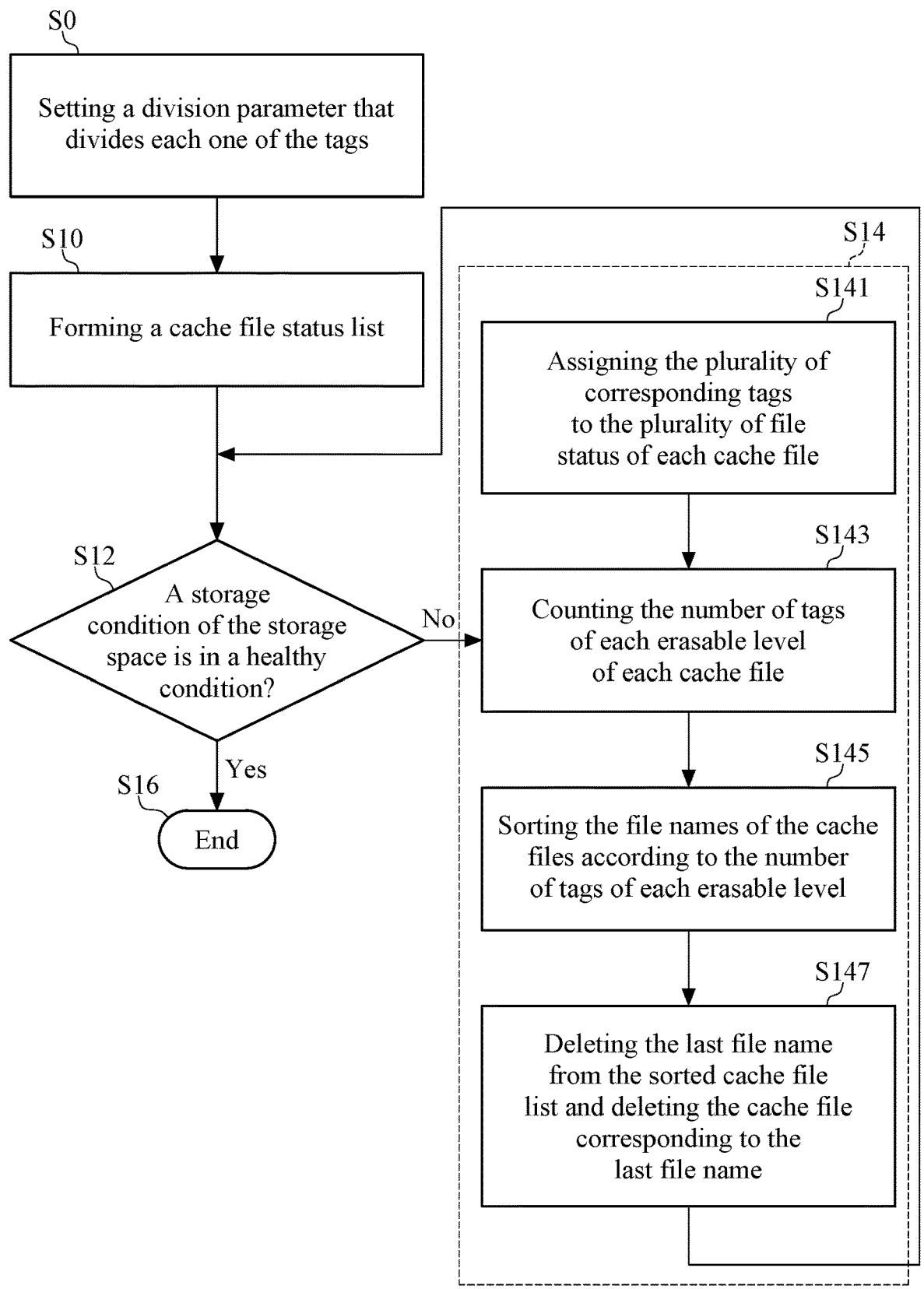
FIG. 3 illustrates a detailed flow chart according to steps S0 and S14 shown in FIG. 2.

FIG. 3 is a detailed flow chart of steps S0 and S14 illustrated according to FIG. 2. In order to better explain the details of steps S0 and step S14 in the embodiment of the present invention, and the details of how to define the tags corresponding to each file status, the following will be explained based on the cache files comprising a first cache file (file A), a second cache file (file B) and a third cache file (file C); and the tags comprising a first erasable level tag (must delete), a second erasable level tag (may delete) and a third erasable level tag (may keep).

Please refer to both FIG. 3 and table 3, wherein table 3 is an example of assigning a corresponding tag to each file status by the processor 20. That is, table 3 is a transient table in the process of forming the sorted cache file list according to the cache file status list when the processor 20 operates in the background, rather than the final sorted cache file list arranged according to the erasable level.

TABLE 3

| File name | File capacity | Execution count |
|---|---|---|
| A | may delete | may delete |
| B | may keep | may keep |
| C | must delete | may keep |

The management method of the present embodiment can further comprise step S0: setting a division parameter that divides each one of the tags. It should be noted that, step S0 can be executed before forming the cache file status list, step S0 can also be executed before forming the sorted cache file list. That is, a user can set the division parameter between two adjacent tags so as to assign a corresponding tag according to different file status. Take "execution count" feature as an example, the user can set the division parameter between the tags "may keep" and "may delete" as 20 times. Therefore, when the file status (number of usage) corresponding to the "execution count" feature is over 20 times, the corresponding tag is "may keep"; when the file status is between 15 to 20 times, the corresponding tag is "may delete".

The aforementioned step S14 can further comprise sub-steps S141, S143, S145 and S147. To be more specific, please first refer to step S10: forming the cache file status list. That is, the processor 20 forms the cache file status list to record the file status of each cache file corresponding to each feature. The processor 20 can update the cache file status list regularly, the processor 20 can also update the cache file status list immediately when the status of the cache file is altered.

After recording the file status corresponding to each feature of each cache file in step S10, and determining the storage condition of the storage space 10 is not in the healthy condition in step S12, the processor 20 performs sub-step S141: assigning the plurality of corresponding tags to the plurality of file status of each cache file.

The following first describes the "file capacity" feature, wherein the processor 20 can assign the corresponding tags to the plurality of file status based on the division parameters, the processor 20 can also assign the corresponding tags to the plurality of file status based on the relative relationships between two or more file status of the cache files (for example, a relative file capacity between the cache files). The present disclosure is not limited thereto. Specifically, for the "file capacity" feature, the tags of files A to C can be set according to the aforementioned division parameters. For example, when the division parameter between the tag "may keep" and the tag "may delete" is 5 GB, and the division parameter between the tag "may delete" and the tag "must delete" is 30 GB, the processor 20 can assign the "may delete" tag to a cache file when a file capacity of the cache file is larger than 5 GB and smaller than 30 GB.

Or, in a case where the larger the file capacity is the more it should be deleted, when file C has the largest file capacity (file status) among the three corresponding to the "file capacity" feature, and the file capacity of file A is larger than file B, then file C can be assigned with a "must delete" tag having the highest erasable level; file A can be assigned with a "may delete" tag having an erasable level lower than file C; and file B can be assigned with a "may keep" tag having an erasable level lower than file A. Therefore, it is able to prevent the storage space 10 being overly occupied.

In addition, in another case where the larger the file capacity is the more it should be kept, when a cache file occupies a larger capacity than another cache file in the storage space 10, the processor 20 can assign a tag that has higher erasable level than the another cache file to the cache file when assigning a corresponding tag to each file status. In other words, when a file capacity of a cache file is larger, that means the time and computation costs of regenerating the cache file is also higher. Therefore, if file B has the largest file capacity among the three and file C has the smallest file capacity among the three, then file C can be assigned with a tag having the highest erasable level and file B can be assigned with a tag having the lowest erasable level. In this way, it is possible to avoid mistakenly deleting cache files that require higher time and computation costs to be regenerated while trying to release the space of the storage space 10.

For example, file A has a file capacity of 10 GB; file B has a file capacity of 50 GB; and file C has a file capacity of 1 GB. Since file A has a file capacity larger than file C, it means the computation and time costs required to regenerate file A is higher comparing to file C. Similarly, since file B has a file capacity larger than file A, it means that the computation and time costs required to regenerate file B is higher comparing to file A.

Therefore, when tags are assigned based on the division parameters, and the division parameter between "may keep" and "may delete" is 80 GB; the division parameter between "may delete" and "must delete" is 5 GB, then file A can be assigned with the "may delete" tag; file B can be assigned with the "may delete" tag; file C can be assigned with the "must delete" tag. Further, when tags are assigned based on the relative relationship between each file, then file A can be assigned with the "may delete" tag; file B can be assigned with the "may keep" tag; file C can be assigned with the "must delete" tag.

However, the erasable level of the cache file can also not have an entirely positive correlation or entirely negative correlation with file capacity. To be more specific, in a case where the erasable level is adjusted based on a correlation between the file capacity and a capacity threshold, the processor 20 can store the setting of the capacity threshold and adjust the erasable level of the cache file based on the correlation between the file capacity and the capacity threshold. The capacity threshold can be a ratio of an entire space of the storage space 10, for example, a median of the entire space of the storage space 10 or a median of the expected occupancy ratio described above. The present disclosure does not limit the definition of the capacity threshold.

For example, in a range smaller than the capacity threshold, when the file capacity of the cache file is farther from the capacity threshold (i.e. when the file capacity is smaller), the processor 20 assigns a tag having a higher erasable level to the cache file; in a range larger than the capacity threshold, when the file capacity of the cache file is farther from the capacity threshold (i.e. when the file capacity is larger), the processor 20 assigns a tag having a higher erasable level to the cache file.

In addition, the capacity threshold can also be a capacity range. When the file capacity of the cache file falls outside of the capacity range and is farther away from boundary values of the capacity range, the processor 20 assigns a tag having a higher erasable level to the cache file. On the contrary, when the file capacity of the cache file falls within the capacity range, the processor 20 assigns a tag having a lowest erasable level to the cache file.

In other words, in a range that is smaller than the capacity threshold or smaller than the lower boundary value of the capacity range, when the file capacity of the cache file is smaller, it means the computation cost and the time cost to regenerate the cache is lower and hence has a higher erasable level. In a range that is larger than the capacity threshold or larger than the upper boundary value of the capacity range, when the file capacity of the cache file is larger, it means the probability of the overall storage operation is being affected by the storage space 10 occupied by the cache file, and the cache file in this range hence has a higher erasable level.

Accordingly, it is possible to assign a corresponding tag more effectively based on the file capacity of the cache file, so as to prevent the storage space 10 from being overly occupied while keeping cache files that have more data.

The processor 20 then assigns a tag to the cache file according to the file status corresponding to the "execution count" feature. For example, when file B and file C have the same execution count and is higher than the execution count of file A, the processor 20 can assign, for example, the "may delete" tag to file A and assign, for example, the "may keep" tag to file B and C corresponding to the file status of the "execution count" feature.

Step S143: counting the number of tags of each erasable level of each cache file.

Continuing from the example of table 3 above, the processor 20 counts the cumulative number of tags of each erasable level of each cache file and obtains a result of file A having two "may delete" tags; file B having two "may keep" tags; file C having one "must delete" tag and one "may keep" tag.

The processor 20 then performs step S145: sorting the file names of the cache files according to the number of tags of each erasable level, and performs step S147: deleting the last file name from the sorted cache file list and deleting the cache file corresponding to the last file name.

Based on the above counting result, even though file name A has two "may delete" tags, file name C has a higher erasable level than file name A since file name C has a "must delete" tag. Further, file name A has a higher erasable level than file name B which has two "may keep" tags since file name A has two "may delete" tags. In other words, as shown by table 4 below, the processor 20 sorts the file names according to the cumulative number of tags of each erasable level to form the sorted cache file list. The sorted cache file list shown by table 4 is the sorted cache file list formed in step S14 of FIG. 1. After forming the sorted cache file list, the processor can delete the last file name from the sorted cache file list and delete the corresponding cache file from the storage space 10.

TABLE 4

| File name | File capacity | Execution count |
| --- | --- | --- |
| B | may keep | may keep |
| A | may delete | may delete |
| C | must delete | may keep |

In addition, the tags can further comprise a highest level tag and a lowest level tag, so that the processor can adjust the sorted cache file list more accurately based on the highest level tag and the lowest level tag, and avoid cache files that are absolutely necessary to be kept being mistakenly deleted, and make sure cache files that do not need to be kept are deleted.

For example, the highest level tag can be "absolute delete"; the lowest level tag can be "absolute keep". For example, when a cache file is assigned with the "absolute delete" tag corresponding to the "last execution time" feature due to a time of the cache file last being accessed is 360 days ago, then the cache file can be sorted to the end of the sorted cache file list (meaning, having the highest erasable level) when forming the sorted cache file list. When a cache file is assigned with the "absolute keep" tag corresponding to the "file capacity" feature due to having a large capacity, then the cache file can be sorted to the top of the sorted cache file list (meaning, having the lowest erasable level) when forming the sorted cache file list.

Therefore, when a cache file has the "absolute delete" tag, then the cache file is guaranteed to be sorted to the end of the sorted cache file list regardless of other tags of the cache file. Similarly, when a cache file has the "absolute keep" tag, then the cache file is guaranteed to be sorted to the top of the sorted cache file list regardless of other tags of the cache file. Consequently, when the storage condition of the storage space is not in the healthy condition, the processor can make sure the cache files being deleted are actually erasable while keeping important cache files, so that the storage space is used properly.

In view of the above description, according to one or more embodiments of a management method of cache files in storage space and a recording device for storing cache files of the present disclosure, it is possible to manage cache files automatically and reduce the need to expand storage space. Also, it is possible to make sure the storage condition of the storage space is maintained in the healthy condition. In addition, according to one or more embodiments of a management method of cache files in storage space and a recording device for storing cache files of the present disclosure, cache files which are larger in capacity or with higher cost when being regenerated are not easily deleted. Therefore, cache files with higher priority or with higher cost when being regenerated are properly kept, and the deleted cache files are made sure to be of low priority or with lower cost when being regenerated.

The present disclosure has been disclosed above in the embodiments described above, however it is not intended to limit the present disclosure. It is within the scope of the present disclosure to be modified without deviating from the essence and scope of it. It is intended that the scope of the present disclosure is defined by the following claims and their equivalents.

What is claimed is:

1. A management method of cache files in storage space, adapted to a storage space storing a plurality of cache files, the management method comprising:
    forming a cache file status list, wherein the cache file status list records a plurality of file names of the cache files and a plurality of file status corresponding to a plurality of features of each cache file, wherein the features comprise a reference execution count, and the reference execution count is a number of times that all cache files with the same generation process as the cache file are executed in a system having a plurality of storage spaces including the storage space;
    determining whether a storage condition of the storage space is in a healthy condition;
    when the storage condition is not in the healthy condition, for the features of each cache file, assigning a plurality of corresponding tags to the plurality of file status and forming a sorted cache file list, wherein the tags are configured to indicate an erasable level of the plurality of file status of a corresponding cache file of the cache files, the sorted cache file list records the file names of the cache files, and the file names in the sorted cache file list are sorted from a file name of a cache file that should be kept most to another file name of another cache file that should be deleted most according to the erasable level marked by the tags of the cache files; and
    deleting the last file name from the sorted cache file list to update the sorted cache file list, and deleting the cache file from the storage space corresponding to the last file name.

2. The management method of cache files in storage space according to claim 1, wherein after deleting the cache file corresponding to the last file name from the storage space, the management method further comprising:
    determining whether the storage condition of the storage space is in the healthy condition;
    deleting the sorted cache file list and ending the management method when determining the storage condition of the storage space is in the healthy condition; and
    deleting a last file name from the updated sorted cache file list and the cache file corresponding to the last file name in the updated sorted cache file list when determining the storage condition of the storage space is not in the healthy condition.

3. The management method of cache files in storage space according to claim 2, wherein determining whether the storage condition of the storage space is in the healthy condition is:
    determining whether an occupancy ratio of the storage space falls within an expected occupancy ratio;
    determining the storage condition of the storage space is in the healthy condition when the occupancy ratio falls within the expected occupancy ratio; and
    determining the storage condition of the storage space is not in the healthy condition when the occupancy ratio does not fall within the expected occupancy ratio.

4. The management method of cache files in storage space according to claim 1, wherein the features further comprise a file capacity, the file capacity is a capacity occupied by a respective one of the cache files in the storage space.

5. The management method of cache files in storage space according to claim 4, wherein the cache files comprise a first cache file and a second cache file, when the first cache file occupies larger capacity in the storage space than the second cache file, the management method further comprising:
    assigning the first cache file with the tag that has higher erasable level than the second cache file.

6. The management method of cache files in storage space according to claim 1, wherein the features further comprise a last execution time, and the last execution time is a time the cache file last being read.

7. The management method of cache files in storage space according to claim 1, wherein the tags comprise a first erasable level tag and a second erasable level tag, and a level of the first erasable level tag is different from a level of the second erasable level tag, the file names in the sorted cache file list are sorted from a file name of a cache file that should be kept most to another file name of another cache file that should be deleted most according to the erasable level marked by the tags of the cache files comprises:

sorting the file names in the sorted cache file list according to a cumulative number of the first erasable level tag and the second erasable level tag of each one of the cache files.

8. The management method of cache files in storage space according to claim 7, wherein the tags further comprise a highest level tag and a lowest level tag, the file names in the sorted cache file list are sorted from a file name of a cache file that should be kept most to another file name of another cache file that should be deleted most according to the erasable level of marked by the tags of the cache files comprises:
sorting the file name of the cache file to an end of the sorted cache file list when the cache file has the highest level tag; and
sorting the file name of the cache file to a top of the sorted cache file list when the cache file has the lowest level tag.

9. The management method of cache files in storage space according to claim 7, wherein the features comprise a first feature, and the first feature has a highest priority among the features, the cache files comprise a first cache file and a second cache file, when the first cache file and the second cache file have a same cumulative number of the first erasable level tag and a same cumulative number of the second erasable level tag, the management method further comprising:
sorting the first cache file and the second cache file according to a level of a tag of the first feature that the first cache file and the second cache file each corresponds to, so that the cache file with a higher erasable level is sorted after another cache file with a lower erasable level.

10. The management method of cache files in storage space according to claim 2, wherein the management method further comprising:
determining whether the storage condition of the storage space is in the healthy condition at every predetermined interval.

11. The management method of cache files in storage space according to claim 1, wherein before forming the sorted cache file list, the management method further comprising:
setting a division parameter that divides each one of the tags.

12. The management method of cache files in storage space according to claim 1, wherein before forming the cache file status list, the management method further comprising:
executing a project, and obtaining the cache files generated during the execution of the project.

13. A recording device for storing cache files, comprising:
a storage space, storing a cache file status list and a sorted cache file list,
wherein the cache file status list records a plurality of file names and a plurality of file status corresponding to a plurality of features of each cache file, wherein the features comprise a reference execution count, and the reference execution count is a number of times that all cache files with the same generation process as the cache file are executed in a system having a plurality of storage spaces including the storage space, and the sorted cache file list records the file names of the cache files, and the file names in the sorted cache file list are sorted from a file name of a cache file that should be kept most to another file name of another cache file that should be deleted most according to an erasable level marked by a plurality of tags of the cache files, wherein the tags are configured to mark the erasable level of the file status of a corresponding cache file of the cache files; and
a processor, electrically connected to the storage space, configured to adjust the sorted cache file list according to the erasable level of the tags of the cache files, so as to sort the file name of the cache file that should be kept most to the another file name of the another cache file that should be deleted most in the sorted cache file list, and determine whether a storage condition of the storage space is in a healthy condition, assign the corresponding tags to the plurality of file status when the storage condition is not in the healthy condition, and form the sorted cache file list, the processor further configured to delete the last file name from the sorted cache file list to update the sorted cache file list, and delete the cache file from the storage space corresponding to the last file name.

14. The recording device according to claim 13, wherein after deleting the cache file from the storage space corresponding to the file name, the processor further determines whether the storage condition of the storage space is in the healthy condition, the processor deletes a last file name from the updated sorted cache file list and the cache file corresponding to the last file name in the updated sorted cache file list when the storage condition of the storage space is not in the healthy condition, and deletes the sorted cache file list when the storage condition of the storage space is in the healthy condition.

15. The recording device according to claim 13, wherein the processor determines whether the storage condition of the storage space is in the healthy condition is: the processor determines whether an occupancy ratio of the storage space falls within an expected occupancy ratio, the processor determines the storage condition of the storage space is in the healthy condition when the occupancy ratio falls within the expected occupancy ratio; the processor determines the storage condition of the storage space is not in the healthy condition when the occupancy ratio does not fall within the expected occupancy ratio.

16. The recording device according to claim 13, wherein the features further comprise a last execution time, and the last execution time is a time the cache file last being read.

17. The recording device according to claim 13, wherein the features further comprise a file capacity, the file capacity is a capacity occupied by a respective one of the cache files in the storage space.

18. The recording device according to claim 17, wherein the cache files comprise a first cache file and a second cache file, when the first cache file occupies a larger capacity in the storage space than the second cache file, the processor assigns the first cache file the tag that has higher erasable level than the second cache file.

* * * * *